United States Patent

[11] 3,577,588

[72] Inventor Douglas S. Chisholm
 Midland, Mich.
[21] Appl. No. 821,827
[22] Filed May 5, 1969
[45] Patented May 4, 1971
[73] Assignee The Dow Chemical Company
 Midland, Mich.

[54] EXTRUSION APPARATUS
 8 Claims, 2 Drawing Figs.
[52] U.S. Cl. .................................................. 18/12
[51] Int. Cl. .................................................. B29f 3/01
[50] Field of Search .......................................... 18/12 (SA),
 125 (B), 125 (E), 12 (SN), 12 (SS), 12 (SP)

[56] References Cited
UNITED STATES PATENTS
2,437,460 3/1948 DeFrancisci ................. 18/12X
FOREIGN PATENTS
930,773 3/1948 France ......................... 18/12

Primary Examiner—James M. Meister
Attorneys—Griswold and Burdick, Richard G. Waterman and Robert B. Ingraham ABSTRACT: A screw having increasing lead or pitch is employed on an extruder with central feed or discharge to provide a self-balancing extrusion apparatus which does not require heavy thrust bearings.

PATENTED MAY 4 1971
3,577,588
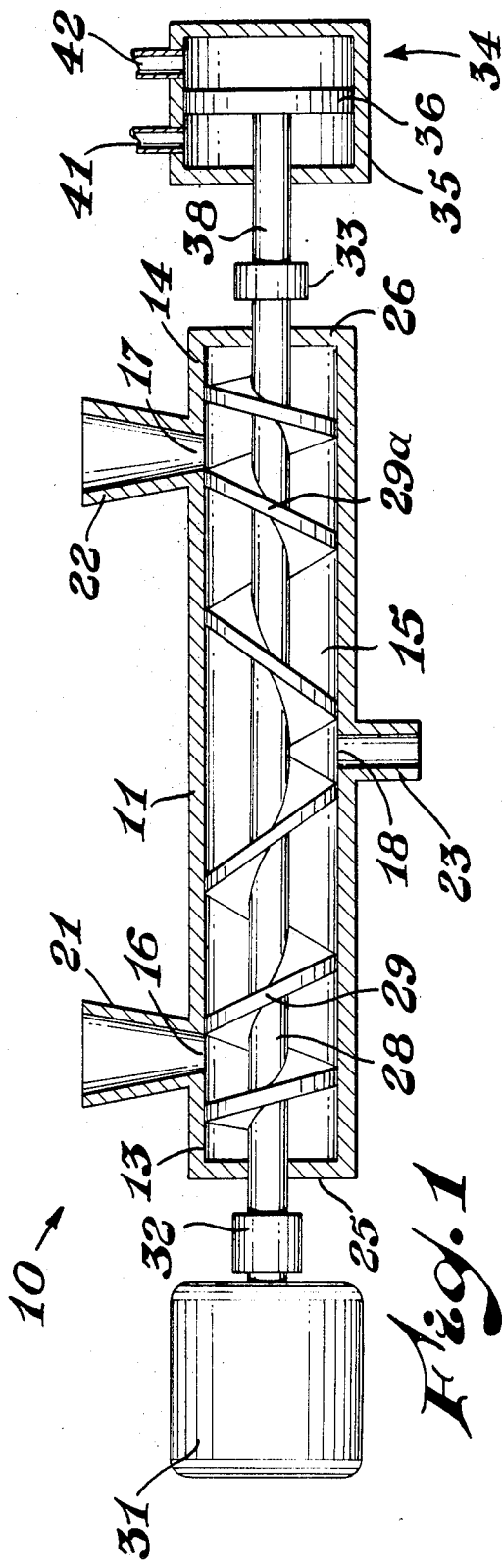
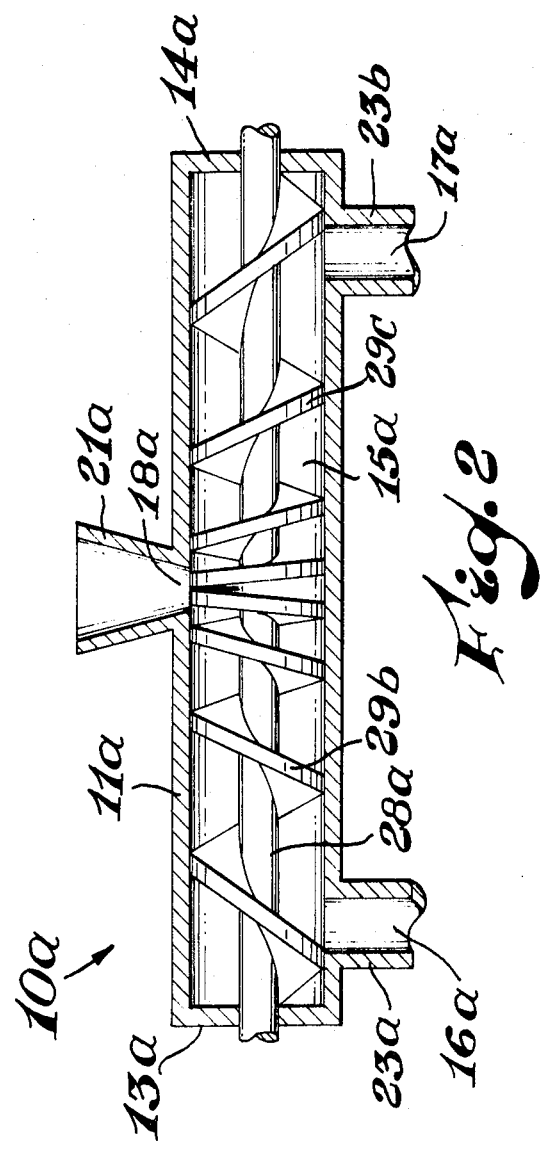
INVENTOR.
Douglas S. Chisholm
BY Robert B. Ingraham
AGENT

EXTRUSION APPARATUS

In conventional screw extruders wherein a material to be extruded is fed to the barrel of the extruder adjacent one end of the screw or worm and discharged from the barrel at the opposite end, substantial thrust bearings are required which present substantial difficulty in design and expense. In an attempt to overcome the problem of thrust bearings, an extrusion apparatus has been provided which, in essence, employs a screw disposed within a barrel and the feed or discharge occurs at the center of the screw and the screw has two distinct portions having a thread of opposite hand. Such an extruder substantially reduces the thrust bearing requirements. However, any unbalance in the feed or discharge provides an axial component force presenting substantial thrust along the axis of the screw.

It would be desirable if there were available an improved screw extrusion apparatus which did not require substantial thrust bearings.

It would also be desirable if there were available an improved screw extrusion apparatus which had a tendency to overcome the unbalance in the forces which tend to cause axial movement of the screw.

It would also be beneficial if there were an improved screw extrusion apparatus which was capable of handling a wide variety of materials.

These benefits and other advantages in accordance with the present invention are achieved in a screw extruder, the screw extruder having a barrel, the barrel defining a generally elongate cylindrical cavity, the barrel having a first end and a second end, a first material passageway disposed at the first end, a second material passageway disposed at the second end, a third material passageway disposed generally between the first and second ends, a screw disposed within the barrel, the screw having a first flight portion extending generally from the first material passageway to the third material passageway, a second flight portion extending from the second material passageway to the third material passageway, the first and second flight portions being of increasing lead and of generally mirror image symmetry; that is, of opposite hand.

Further features and advantages of the present invention will become more apparent from the following specification taken in connection with the drawing wherein;

FIG. 1 is a simplified schematic view of one embodiment of the invention.

FIG. 2 is a simplified schematic view of an alternate embodiment of the invention.

In FIG. 1 there is schematically depicted an extrusion apparatus in accordance with the present invention generally designated by the reference numeral 10. The apparatus 10 comprises in cooperative combination an extruder barrel 11, the barrel 11 defining a first end 13 and a second end 14. A generally cylindrical cavity 15 is defined by the barrel 11. A first material passage 16 is disposed adjacent the first end 13 of the barrel 11. A second material passage 17 is disposed adjacent the second end 14 of the barrel 11. A third material passage 18 is disposed intermediate between the first passage 16 and the second passage 17. Each of the passages 16, 17 and 18 communicate with the cavity 15. The passages 16 and 17 have in operative association therewith hoppers 21 and 22, respectively. A discharge conduit 23 is in operative combination with the passage 18. End pieces 25 and 26 disposed at the ends 13 and 14 of the barrel 11 have rotatably journaled therein an extrusion screw 28. The screw 28 has disposed thereon a first flight or thread portion 29. The thread portion 29 has increasing lead or pitch and working volume in a direction from the first material opening 16 toward the third material opening 18. A second flight portion 29a is disposed on the screw 28 and has increasing lead and working volume extending from the second material opening 14 to the third material opening 18. The flights 29 and 29a are symmetrical about a plane normal to the axis of the screw and have mirror image symmetry; that is, the flights 29 and 29a are of opposite hand. The screw 28 is capable of limited axial movement within the cavity 15. A means to rotate the screw or a motor 31 is disposed adjacent the first end 13 of the barrel 11. The motor 31 is in operative engagement with the screw 28 by means of a coupling 32 adapted to permit axial motion of the screw relative to the motor 31. Any of a wide variety of spline connections which permit longitudinal motion of a shaft while imparting axial motion are eminently satisfactory for such an application. At the opposite end of the screw 28 is a swivel connector 33 which imparts axial motion to the screw 28 while permitting the screw to freely rotate therein. Such swivel connections are well known in the art and need not be further described. The swivel connector 33 is in operative communication with a linear actuator 34 which typically is a hydraulic cylinder such as the cylinder 35 having a fluid actuated piston 36 which is in operative communication with the swivel 33 by means of a shaft 38. The hydraulic cylinder 35 is of a double acting variety and has fluid ports 41 and 42 in operative communication with a source of pressurized hydraulic fluid, not shown. Advantageously, a four-way hydraulic control valve in operative combination with the swivel 33 controlling the fluid to the ports 41 and 42 will provide suitable axial force to maintain the screw in a desired axial location. Although a hydraulic cylinder is depicted, any conventional positioning means may be employed.

In operation of the apparatus of FIG. 1, material to be extruded is provided to the hoppers 21 and 22. Material from the hoppers 21 and 22 passes through the passages 16 and 17 into the cavity 15 on rotation of the screw 28 by the motor 31 in a clockwise direction (facing shaft). The screw conveys material from the ends 13 and 14 of the barrel 11 toward the center of the barrel and discharges the material from the passage 18 through the conduit 23. If for some reason the feed becomes unbalanced, such as by a minor change in the nature of the material being fed to one hopper, the screw tends to be self-centering. For example, the resistance of the material fed from the hopper 21 increases and the screw moves to the left. The forces applied to the material being carried by the flight portion 29a (from hopper 22) increase because of the decreasing effective pitch of the screw in the working portion of the barrel. Thus, a major portion of the unbalanced force is taken up by friction between material being extruded and the screw itself and is applied to the screw as tension rather than as pressure on a thrust bearing. Beneficially, if severe unbalance occurs, additional force may be applied to more or less center the screw by the linear positioning means 34.

An alternate embodiment of the invention is depicted in FIG. 2 wherein an extruder 10a is shown. The extruder 10a has a barrel 11a, a first end 13a and a second end 14a. The barrel 11a defines a cavity 15a. A first material passage or outlet 16a is defined adjacent the first end 13a. A second material passage or outlet 17a is disposed adjacent the second end 14a. A third passage 18a is disposed at a generally central location intermediate the passages 16a and 17a. A feed hopper 21a is in association with the material passage 18a, and dischaRge conduits 23a and 23b are in operative combination with the passages 16a and 17a. A screw 28a has a first flight portion 29b and a second flight portion 29c. The portions 29b and 29c have mirror image symmetry about a plane passing through the axis of the screw and lying generally midway between the ends of the screw. Thus, the flight portions are of increasing pitch in a direction proceeding from the third passage 18a and progressing toward the first and second passages 16a and 17a.

The embodiment of FIG. 2 operates in a manner substantially similar to the embodiment of FIG. 1 with the exception that feed is at a central location of the barrel and discharge is at the ends of the barrel. The same self-centering tendency is exhibited.

Extruders in accordance with the present invention are eminently suited for the extrusion of plastic masses such as clay, synthetic resins of the thermoplastic or thermosetting varieties which may be extruded, and for the extrusion of filamentary reinforcing. The generally radial discharge of the extruders advantageously tends to align or orient solid particles within the plastic mass.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

I claim:

1. A screw extruder, the screw extruder having:
   a barrel, the barrel defining
   a generally elongate cylindrical cavity, the barrel having
   a first end and
   a second end,
   a first material passageway disposed at the first end,
   a second material passageway disposed at the second end,
   a third material passageway disposed generally between the first and second ends,
   a screw disposed within the barrel, the screw having
   a first flight portion extending generally from the first material passageway to the third material passageway,
   a second flight portion extending from the second material passageway to the third material passageway, the first and second flight portions being of increasing lead and of generally mirror image symmetry; that is, of opposite hand.

2. The apparatus of claim 1 in operative combination with means to axially position the screw.

3. The apparatus of claim 1 wherein the first and second portions increase in lead toward the third material passageway.

4. The apparatus of claim 3 wherein the third passageway is generally centrally disposed between the first and second passageways.

5. The apparatus of claim 1 including means to rotate the screw.

6. The apparatus of claim 1 wherein the first and second portions decrease in lead toward the third material passageway.

7. The apparatus in accordance with claim 1 wherein the means to rotate the screw is a motor operatively coupled thereto by means of a spline connection which permits longitudinal motion of the screw.

8. The apparatus of claim 7 including means to axially position the screw in operative combination therewith by means of a swivel connector.